(12) United States Patent
Wood (10) Patent No.: US 8,251,372 B2
(45) Date of Patent: Aug. 28, 2012

(54) CARTRIDGE AND RELATED METHODS

(75) Inventor: Michael H. Wood, Ramsey, IN (US)

(73) Assignee: Delaware Capital Formation, Inc., Wilmington, DE (US)

( * ) Notice: Subject to any disclaimer, the term of this patent is extended or adjusted under 35 U.S.C. 154(b) by 487 days.

(21) Appl. No.: 12/437,917

(22) Filed: May 8, 2009

(65) Prior Publication Data

US 2009/0295096 A1    Dec. 3, 2009

Related U.S. Application Data

(60) Provisional application No. 61/057,497, filed on May 30, 2008.

(51) Int. Cl.
*F16J 15/18* (2006.01)
*F16J 15/00* (2006.01)

(52) U.S. Cl. ........................... 277/511; 277/543

(58) Field of Classification Search .................. 277/500, 277/510–512, 513, 543, 544
See application file for complete search history.

(56) References Cited

U.S. PATENT DOCUMENTS

| | | | |
|---|---|---|---|
| 754,139 A | 3/1904 | Hodge | |
| 986,029 A | 3/1911 | Steinert | |
| 1,038,759 A | 9/1912 | Judd | |
| 1,473,451 A * | 11/1923 | Walters | 277/510 |
| 1,499,583 A * | 7/1924 | Leroy | 277/366 |
| 1,828,178 A | 10/1931 | Fox | |
| 2,049,774 A * | 8/1936 | Hoffman | 277/500 |
| 2,479,711 A * | 8/1949 | Arutunoff | 277/385 |
| 2,853,020 A * | 9/1958 | Hollinger et al. | 384/131 |
| 2,867,458 A * | 1/1959 | Kroekel | 277/543 |
| 2,937,896 A * | 5/1960 | Jones | 277/366 |
| 3,301,191 A * | 1/1967 | Warren | 277/366 |
| 3,361,431 A * | 1/1968 | Liss et al. | 277/366 |
| 3,405,948 A | 10/1968 | Junker | |
| 3,588,126 A | 6/1971 | McKillop et al. | |
| 3,955,673 A | 5/1976 | Fosness | |
| 4,257,617 A | 3/1981 | Hill | |
| 4,501,429 A * | 2/1985 | White | 277/368 |
| 4,971,306 A * | 11/1990 | Jinnouchi et al. | 277/544 |
| 5,039,043 A | 8/1991 | Hodge | |
| 5,058,904 A | 10/1991 | Nevola | |
| 5,332,234 A | 7/1994 | Forch et al. | |

(Continued)

FOREIGN PATENT DOCUMENTS

WO    96/28672 A1    9/1996

*Primary Examiner* — Vishal Patel
*Assistant Examiner* — Nicholas L Foster
(74) *Attorney, Agent, or Firm* — Berenato & White, LLC (57) ABSTRACT

A cartridge for mounting around a movable shaft is provided. According to one exemplary embodiment, the cartridge features a cartridge housing, first and second rings having respective radial inner peripheries for establishing interfaces with a movable shaft, first and second pressure plates situated in the cartridge housing between the first and second rings, and a biasing member urging the first and second pressure plates towards the first and second rings, respectively. According to a second exemplary embodiment, the cartridge features a cartridge housing, a ring having a radial inner periphery for establishing an interface with a movable shaft, a pressure plate situated in the cartridge housing between the protruding portion and the ring, and a biasing member urging the pressure plate towards the ring. The cartridges of both embodiments may be designed to permit removal of the ring (s) from the cartridge housing without requiring removal of either the pressure plate (s) or the biasing member(s).

25 Claims, 9 Drawing Sheets

U.S. PATENT DOCUMENTS

| | | | |
|---|---|---|---|
| 5,375,853 A * | 12/1994 | Wasser et al. | 277/366 |
| 5,516,118 A | 5/1996 | Jones | |
| 5,558,341 A * | 9/1996 | McNickle et al. | 277/400 |
| 6,126,171 A | 10/2000 | Vensland | |
| 6,641,140 B1 * | 11/2003 | Matsumoto et al. | 277/366 |
| 6,685,191 B2 * | 2/2004 | Toal | 277/370 |
| 6,871,858 B2 | 3/2005 | Futani | |
| 7,726,658 B2 * | 6/2010 | Grunwald et al. | 277/366 |
| 2009/0212503 A1 * | 8/2009 | Huang | 277/513 |
| 2011/0197756 A1 | 8/2011 | Hold et al. | |

* cited by examiner

CARTRIDGE AND RELATED METHODS

CROSS-REFERENCE TO RELATED PATENT APPLICATIONS

This application claims the benefit of priority under 35 U.S.C. §119(e) of provisional application 61/057,497 filed in the U.S. Patent & Trademark Office on May 30, 2008, the disclosure of which is incorporated herein by reference.

FIELD OF THE INVENTION

The present invention relates to a cartridge assembly especially useful with equipment having a movable shaft, for example, a reciprocating or rotating compressor and/or pump. In particularly exemplary embodiments, the cartridge is self-contained, side-loading, low friction, and designed to position rings, such as for example seal rings or scraper rings, against a surface of a movable shaft.

BACKGROUND OF THE INVENTION

Devices containing seal rings, such as segmented seal rings, are known for use in establishing fluid-tight seals along outer cylindrical shaft surfaces of compressors, pumps, turbines, and other equipment. Scraper rings are known for cleaning the outer cylindrical surfaces of such equipment. After prolonged use, the seal and scraper rings of such devices tend to experience wear and damage, requiring the repair or replacement of the rings.

Many of these conventional devices contain multiple small parts for retaining their seal and scraper rings in place and biasing the rings against the shaft surface. The mere replacement of a single worn or damaged seal or scraper ring may require extensive efforts to disassemble and reassemble the device, not only with respect to the damaged and replacement rings, but also with respect to non-damaged parts that must be removed to access the damaged rings. The resulting manpower, time consumption and expenses for repairing the devices can become quite costly. Further, the compressor, pump, turbine, or other equipment remains non-operational during these extensive repair efforts, deleteriously affecting overall productivity.

SUMMARY OF THE INVENTION

According to a first aspect of the invention, a cartridge for mounting around a movable shaft is provided. The cartridge features a cartridge housing, first and second rings having respective radial inner peripheries for establishing interfaces with a movable shaft, first and second pressure plates situated in the cartridge housing between the first and second rings, and a biasing member urging the first and second pressure plates towards the first and second rings, respectively.

A second aspect of the invention provides a cartridge featuring a cartridge housing, first and second rings having respective radial inner peripheries for establishing interfaces with a movable shaft, first and second pressure plates situated in the cartridge housing between the first and second rings, and a biasing member situated in the cartridge housing urging the first and second pressure plates towards the first and second rings, respectively. The first and second rings are removable from the cartridge housing without requiring removal of either one of the pressure plates or the biasing member from the cartridge housing.

A third aspect of the invention provides a cartridge for mounting around a movable shaft. The cartridge features a cartridge housing, a ring having a radial inner periphery for establishing an interface with a movable shaft with a protruding portion, a pressure plate situated in the cartridge housing between the protruding portion and the ring, and a biasing member situated in the cartridge housing urging the pressure plate towards the ring, The ring is positioned to permit its removal from the cartridge housing without requiring removal of either the pressure plate or the biasing member from the cartridge housing.

A fourth aspect of the invention provides an assembly featuring the cartridges of any one or more of the first through third aspects, assembled with at least one annular member and fitted around a movable shaft.

A fifth aspect of the invention provides a method of making a cartridge, such as the cartridge of any one of the first through third aspects. The method features loading a biasing member into an opening of a first cartridge housing component, situating at least one pressure plate adjacent to the cartridge housing component to receive an urging force from the biasing member, assembling the first cartridge housing component and a second cartridge housing component together to retain the pressure plate, and placing at least one ring adjacent the pressure plate to receive the urging force of the biasing member transmitted through the pressure plate, the ring having a radial inner periphery sized for establishing an interface with a movable shaft.

A sixth aspect of the invention provides a method of repairing a cartridge, such as the cartridge of any one of the first through third aspects. The method of this aspect comprises replacing the ring of the cartridge without disassembling any of the cartridge housing, the pressure plate, and the biasing member from one another.

A seventh aspect of the invention provides a method of using a cartridge, such as the cartridge of any one of the first through third aspects.

Other aspects of the invention, including devices, apparatus, assemblies, systems, equipment, kits and methods of making and using the same, and the like which constitute part of the invention, will become more apparent upon reading the following detailed description of the exemplary embodiments and viewing the drawings.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings.

DETAILED DESCRIPTION OF EXEMPLARY EMBODIMENTS OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the exemplary embodiments and methods. The invention according to its various aspects is particularly pointed out and distinctly claimed in the attached claims read in view of this specification, and appropriate equivalents.

It is to be noted that, as used in the specification and the appended claims, the singular forms "a," "an," and "the" include plural referents unless the context clearly dictates otherwise.

Figure 1:
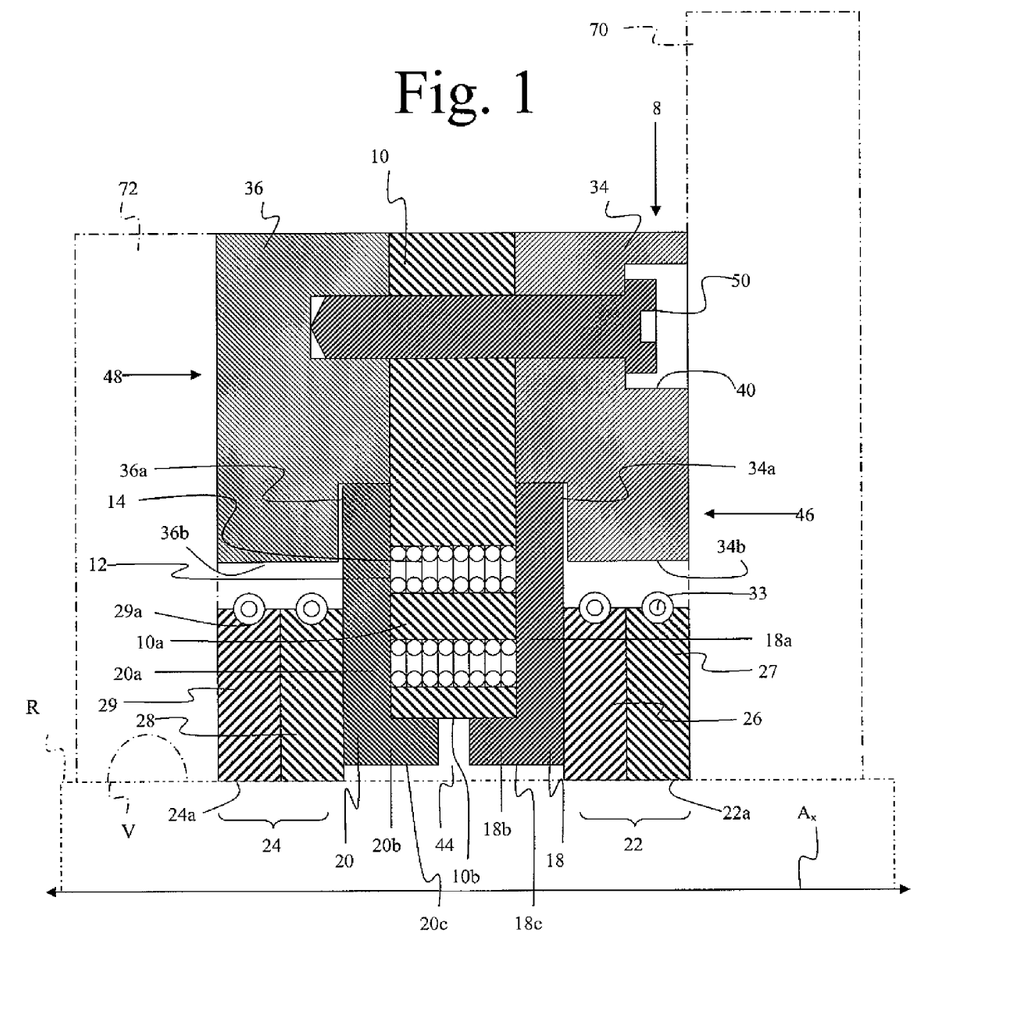
FIG. 1 is a fragmentary cross-sectional view of a cartridge device of a first exemplary embodiment of the invention, the section taken along an axial plane of the cartridge device.

FIG. 1 depicts a cartridge 8 according to a first exemplary embodiment of the invention. The cartridge 8 of this first exemplary embodiment is especially useful with equipment such as reciprocating compressors, pumps, and apparatus handling compressed fluids. The cartridge 8 of the first exemplary embodiment provides a structural seal which allows purge/buffer fluid to be introduced around a reciprocating rod R of the equipment. Compressors and pumps equipped with pump pistons are disclosed in U.S. Pat. No. 6,286,837.

Figure 2:
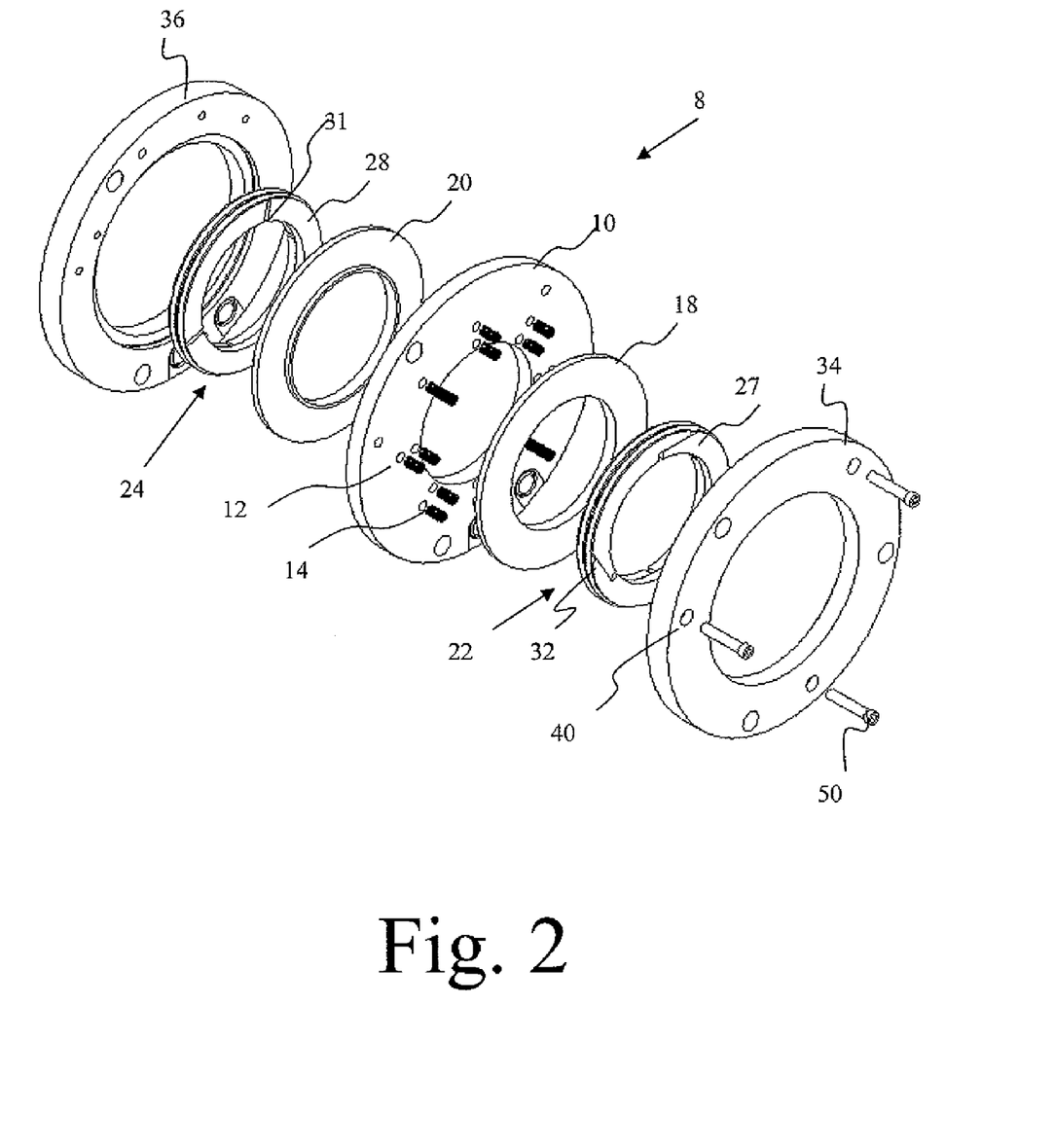
FIG. 2 is an exploded assembly view of the cartridge device of FIG. 1.

The cartridge 8 includes an annular cartridge housing including a central housing plate 10 and first and second outer housing plates 34, 36 located on opposite sides of the central housing plate 10. As best shown in FIG. 2, the central housing plate 10 and outer housing plates 34, 36 contain bores 40 which align with one another to receive a mechanical fastener, such as bolts or cap screws 50. The bore 40 of housing plate 36 may be threaded, with the other aligned bores 40 of central housing plate 10 and outer housing plate 34 being unthreaded. Optionally, each bore 40 may be threaded. The aligned bores 40 are shown countersunk into the first outer housing plate 34. The aligned bores 40 may be circumferentially spaced around the central housing plate 10 and outer housing plates 34, 36. While three sets of aligned threaded bores 40 are shown in FIG. 2, the cartridge 8 may contain fewer or more sets of bores 40. Alternatively, a different fastener or bonding agent may be employed for securing the cartridge housing together.

The central housing plate 10 and the first and second outer housing plates 34, 36 each have radial inner surfaces 10b, 34b, and 36b, respectively, which define respective central openings sized to permit receipt and reciprocating movement of a shaft (also referred to as a rod) R along longitudinal axis $A_x$. The central housing plate 10 has a protruding portion 10a which extends inward beyond the radial inner surfaces 34b, 36b of the first and second outer housing plates 34, 36. The protruding portion 10a provides the central opening defined by radial inner surface 10b with a smaller diameter than the central openings defined by the radial inner surfaces 34b, 36b of the first and second outer housing plates 34, 36, as best shown in FIG. 1. The radial inner surfaces 34b, 36b of the first and second outer housing plates 34, 36 each include a counterbore 34a, 36a in the general shape of a shoulder.

The protruding portion 10a of the central housing plate 10 includes a plurality of through bores 12 generally circumferentially uniformly spaced from one another about the central housing plate 10. The through bores 12 are paired in sets of two, with one through bore being radially aligned with the other through bore of its set. It should be understood that different arrangements of through bores 12 may be provided. Through bores 12 may be replaced with bottom-containing recesses on opposite sides of the central housing plate 10, if desired. Each of the through bores 12 (or other openings, such as recesses in the above-mentioned alternative embodiment) receives a biasing member in the form of a compression spring 14. It should be understood that the biasing member may take other forms. For example, the compression springs 14 may be replaced with wave springs or o-rings placed on the opposite sides of the central housing plate 10. Mechanical, electrical, hydraulic, or pneumatic devices such as expandable bladders may be used in lieu of the compression springs 14. Combinations of such biasing members are also an option.

First and second pressure plates 18, 20 are situated on opposite sides of the protruding portion 10a of the central housing plate 10. The pressure plates 18, 20 of the illustrated embodiment are annular, possessing generally "L"-shaped cross sections defined by longer radially extending legs 18a, 20a partially received in the counterbores 34a, 36a, respectively, and shorter axially extending legs or flanges 18b, 20b extending along the radial inner surface 10b of the central housing plate 10 and establishing a gap (which forms part of T-shaped spatial region 44) between their respective facing ends. (It should be understood that plates 18, 20 may have different cross-sectional shapes. For example, the shorter axially extending legs or flanges 18b, 20b may be eliminated.) The radially extending legs 18a, 20a of the pressure plates 18, 20 have annular surfaces facing the opposite sides of the central housing plate 10 and respectively contacting the opposite ends of the compression springs 14. The radially extending legs 18a, 20a of the pressure plates 18, 20 also have opposite surfaces facing away from one another and contacting first and second segmented seal rings 22, 24, respectively.

The compression springs 14 impart a biasing force against the pressure plates 18, 20 to urge the pressure plates 18, 20 away from one another and towards the seal rings 22, 24, respectively. Although the springs 14 urge the pressure plates 18, 20 away from one other, movement of the pressure plates 18, 20 (axially away from one another) is limited by the shoulder-defining surfaces of counterbores 34a, 36a. In FIG. 1, the counterbores 34a, 36a are slightly greater in width (measured along the axis $A_x$) than the thickness of the radially extending legs 18a, 20a of the pressure plates 18, 20, respectively.

The first and second segmented seal rings 22, 24 are situated on opposite sides of the first and second pressure plates 18, 20. In the illustrated embodiment, the first seal ring 22 is represented as a two-component ring including a first ring component 26 and a second ring component 27. The second seal ring 24 is represented as a two-component ring including a first ring component 28 and a second ring component 29. The first ring components 26, 28 of the segmented seal rings 22, 24 each comprise a plurality of segments (e.g., three) separated from one another by radial cuts 31. The second ring components 27, 29 of the segmented seal rings 22, 24 each feature a plurality of segments (e.g., three) separated from one another by non-radial (also known as tangential) cuts 32. The radial outer surfaces (outer edges) of the first ring components 26, 28 and the second ring components 27, 29 have grooves. Reference numeral 29a represents the groove of one of the second ring components 29. The grooves of the other ring components 26-28 are similarly located. Resilient elements such as garter springs 33 are received in the grooves, e.g., 29a and extend around the peripheries of the ring components 26-29 for urging the segments of the ring components 26-29 radially inward into sealing contact with the surface of rod R. The garter springs 33 securely retain the segments of each ring component 26-29 together, while permitting each of the ring components 26-29 to expand and contract radially outward and inward to accommodate any variations in the diameter of the rod R or radial wear in ring components 26-29.

It should be understood that alternative ring components and arrangements may be selected. While two-component segmented rings are illustrated, the seal rings 22, 24 may include one, two, three, or more components. Seal rings are known in the art, as described, for example, in U.S. Pat. No. 5,058,904. The segmented seal rings 22, 24 may be replaced with other rings, either sealing or non-sealing, such as scrapers. Scrapers are generally known in the art and described, for example, in U.S. Pat. No. 1,828,178. The seal rings 22, 24 alternatively may be solid (non-segmented), as described for example in U.S. Pat. No. 6,286,837.

As mentioned above, the compression springs 14 impart a biasing force against the pressure plates 18, 20. The biasing force urges the pressure plates 18, 20 axially away from one another and into contact with the segmented seal rings 22, 24, respectively. In the embodiment illustrated in FIG. 1, the width of the counterbores 34a, 36a is slightly greater than the thickness of the radially extending leg portions 18a, 20a of the pressure plates 18, 20 to allow the pressure plates 18, 20 to slide axially and against rings 22, 24, respectively. The rings 22, 24 are in turn pressed against flange 70 and vent plate 72 (discussed below).

The segmented seal rings 22, 24 have respective radial inner peripheries 22a, 24a with a first inner diameter for establishing sealing interfaces with the reciprocal rod R. The first and second pressure plates 18, 20 have respective radial inner surfaces 18c, 20c with a second inner diameter which is greater than the first inner diameter of the inner peripheries 22a, 24a of the segmented seal rings 22, 24. The larger second inner diameter of the pressure plates 18, 20 establishes spatial gaps (forming part of inverted T-shaped spatial region 44) between the radial inner surfaces 18c, 20c of the pressure plates 18, 20 and the surface of the reciprocating rod R.

The radial inner surface 10b of the central housing plate 10 has a third inner diameter which is greater than the second inner diameter defined by the radial inner surfaces 18c, 20c of the pressure plates 18, 20. A spatial gap is established between the radial inner surface 10b of the central housing plate 10 and the outer surface of the reciprocating rod R. Collectively, the spatial gaps defined by the radial inner surfaces 10b, 18c, 20c of the central housing plate 10 and the pressure plates 18, 20 communicate with one another to establish an inverted T-shaped spatial region 44 encircling the rod R.

Figure 3:
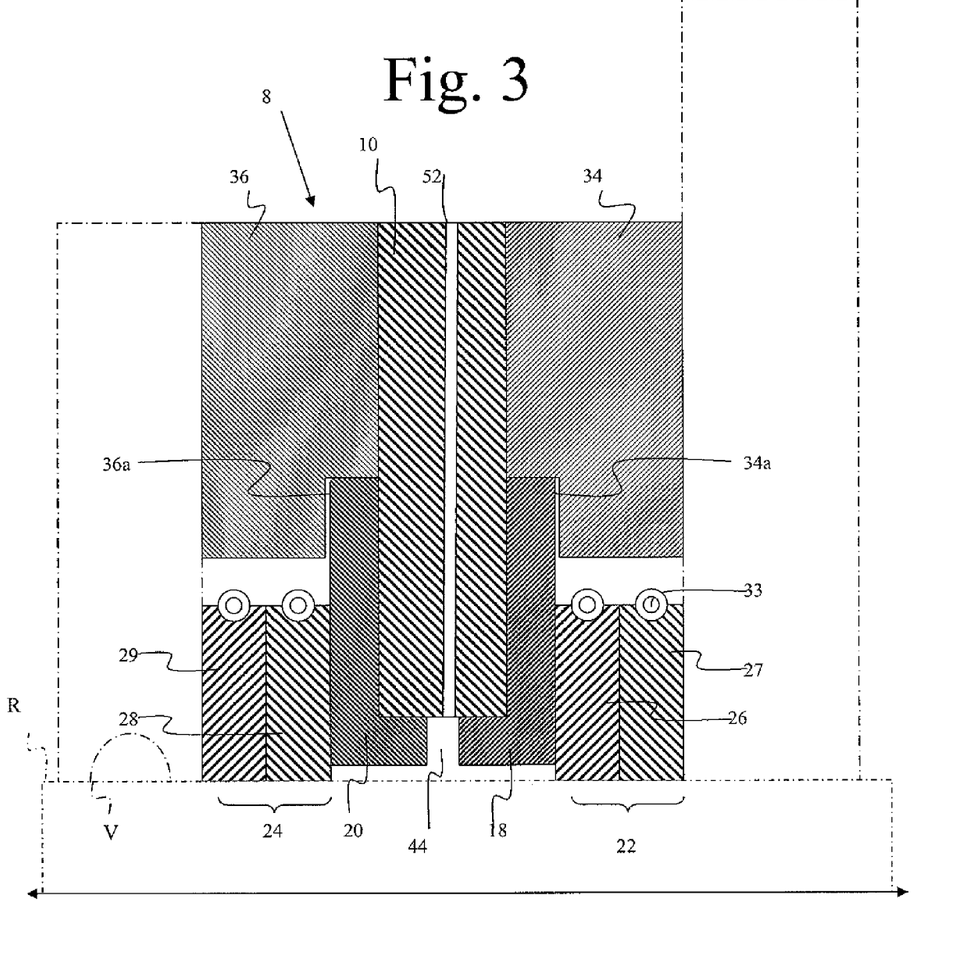
FIG. 3 is another fragmentary cross-sectional view of the cartridge device of FIG. 1, the section taken along a different axial plane than FIG. 1 to illustrate an internal passage of the cartridge device.

Internal passage or passages 52 (FIG. 3) in the cartridge housing place the environment at the periphery of the cartridge housing in communication with the spatial region 44. FIG. 3 illustrates an internal passage 52 extending in a substantially radial direction through the central housing plate 10, from the outer periphery of the cartridge housing to the spatial region 44. Similar internal passages 52 may be circumferentially spaced about the central housing plate 10. One or more purge/buffer fluids may be delivered through the internal passage(s) 52 into the spatial region 44 between the seal rings 22, 24 to create a constant positive barrier and urge the medium being compressed into the upstream vent and/or drain lines V for controlled disposition.

Those skilled in the art will appreciate that end 48 (to the left in FIG. 1) of the cartridge 8 is the high pressure end and that the other end 46 (to the right in FIG. 1) of the cartridge 8 is the low pressure end. The cartridge 8 provides both a mechanical and fluid seal for rod R as it reciprocates within the central opening of the cartridge 8, thus preventing fluid being compressed at the high pressure end 48 from communicating with the low pressure end 46.

Figure 4:
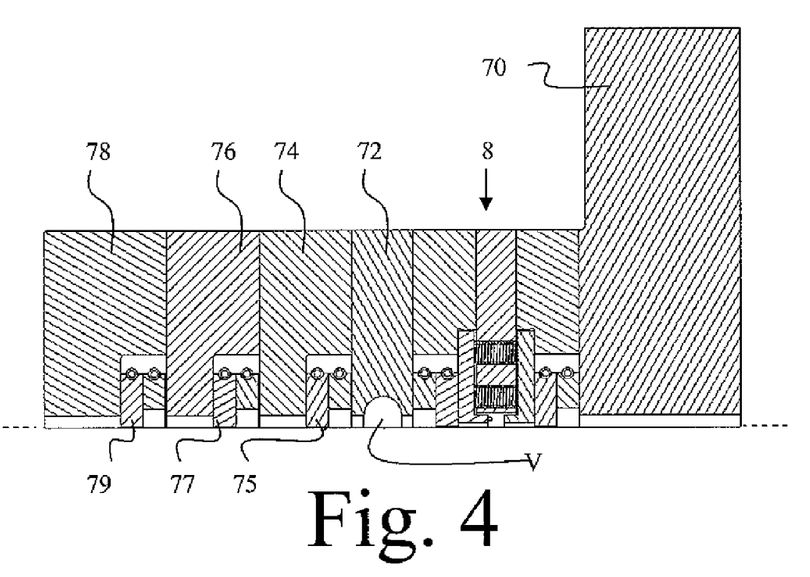
FIG. 4 is a fragmentary cross-sectional view of an assembly containing the cartridge device of FIGS. 1-3.
Figure 5:
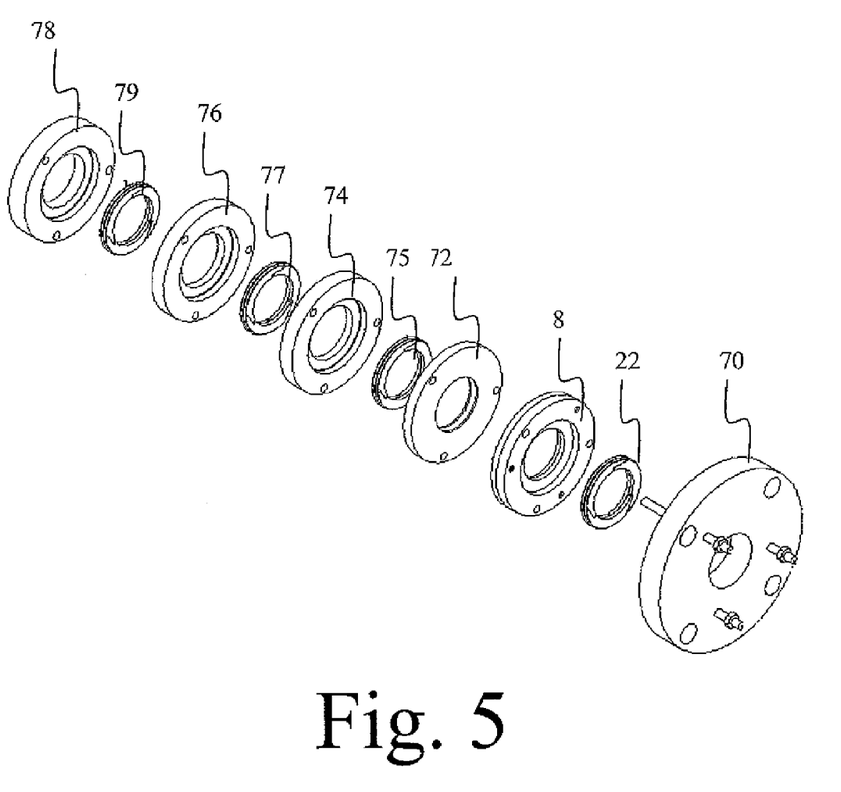
FIG. 5 is an exploded assembly view of the assembly of FIG. 4.

FIGS. 4 and 5 depict a cross-sectional view and an exploded assembly view, respectively, of a piston or compressor assembly containing the cartridge 8 of the first exemplary embodiment described above. At the high pressure end 48 of cartridge 8 is a vent plate 72 with vent V, a first plain cup 74 with seal ring(s) 75, a second plain cup 76 with seal ring(s) 77, and an end cup 78 with seal ring(s) 79. The vent plate 72 includes a passage or vent V to capture diverted fluid. Adjacent to the lower pressure end 46 of cartridge 8 is a flange 70 containing holes for bolting or otherwise attaching the packing-case to the compressor body, as well as connections for the internal passages. The assembly may include fewer or additional components than shown, such as gaskets, lube cups, and other components known in the art.

The cartridge 8 may be assembled together in any suitable manner. For example, according to one embodiment the compression springs 14 are fit in through bores 12 of the center housing plate 10. The first and second pressure plates 18, 20, are then placed on opposite sides of the center housing plate 10 to enclose through bores 12 and fix the compression springs 14 in place between the pressure plates 18, 20. The first and second outer housing plates 34, 36 are placed on opposite sides of the center housing plate 10 so as to receive the radial outer stems of legs 18a, 20a of the pressure plates 18, 20 in the counterbores 34a, 36a. A fastener 50 is inserted into the aligned bores 40 of the housing plates 10, 34, 36 and fixed in place, preferably by screw threads. The first and second seal rings 22, 24 are then loaded into respective cavities at the centers of the outer plates 34, 36, respectively. The seal rings 22, 24 may be preloaded into the cartridge 8 or loaded when the cartridge 8 is installed on shaft/rod R.

During repair of the cartridge 8, damaged or worn rings 22, 24 may be repaired or replaced without requiring removal of either of the pressure plates 18, 20 or the biasing members 14 from the cartridge housing.

Figure 6:
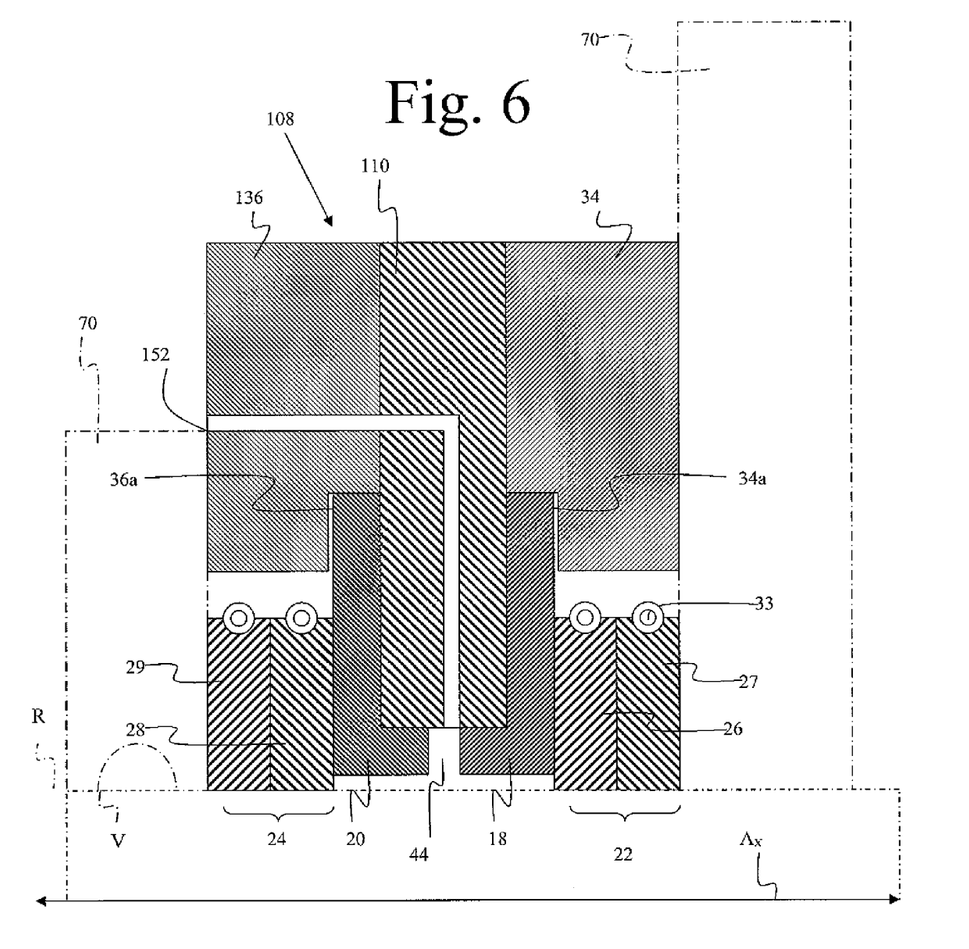
FIG. 6 is a fragmentary cross sectional view of a cartridge device according to a modification of the first exemplary embodiment of the invention, with a modified internal passage.

It should be understood that various modifications and refinements may be made to the first exemplary embodiment and other embodiments described herein. For example, the internal passage arrangement may be modified or eliminated to possess various other shapes and extend through alternative or additional components. An example of a modified cartridge device 108 is shown in FIG. 6, in which one of multiple internal passages 152 is illustrated to include an axially extending section (parallel to $A_x$) extending through an outer housing plate 136 and into a central housing plate 110, and a radially extending section (orthogonal to $A_x$) passing through the central housing plate 110 with one end communicating with the axially extending section and its other end terminating at the spatial region 44. All other parts of this modified embodiment are described above, and are designed with like reference numerals.

Figure 7:
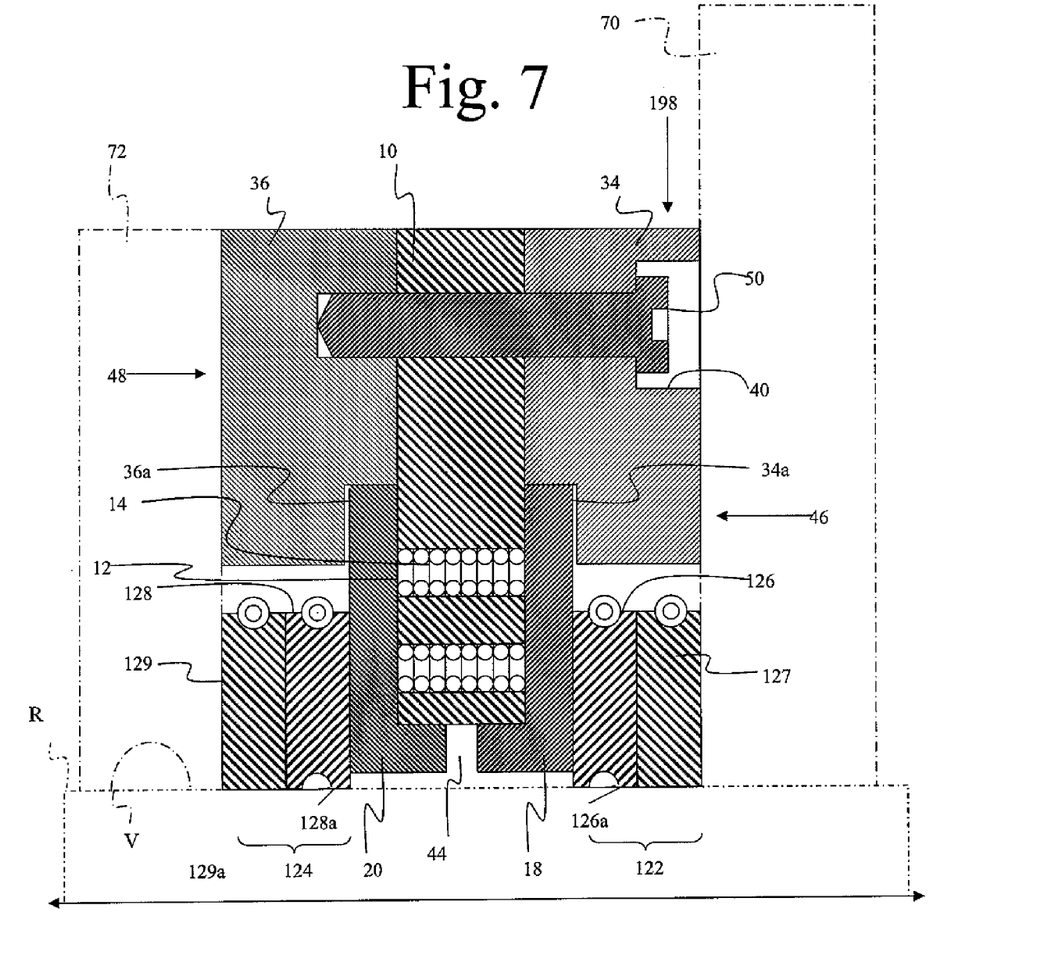
FIG. 7 is a fragmentary cross sectional view of a cartridge device according to another modification of the first exemplary embodiment of the invention, with scraper rings.

Another modification touched on above is to replace one or more of the seal rings with a scraper ring. An example of a modified cartridge device 198 is shown in FIG. 7, in which a first set of rings 122 including first inner scraper 126 and first outer ring 127 is placed adjacent the first pressure plate 18, and a second set of rings 124 including a second inner scraper 128 and a second outer ring 129 is placed adjacent the second pressure plate 20. Each scraper 126, 128 has a scraping edge 126a, 128a at its inner diameter for performing a scraping function against the rod R as the rod R reciprocates. Scraping edges could be of different configuration than shown in FIG. 7. Rings 126-129 each possess a corresponding garter ring (unnumbered) in FIG. 7.

Figure 8:
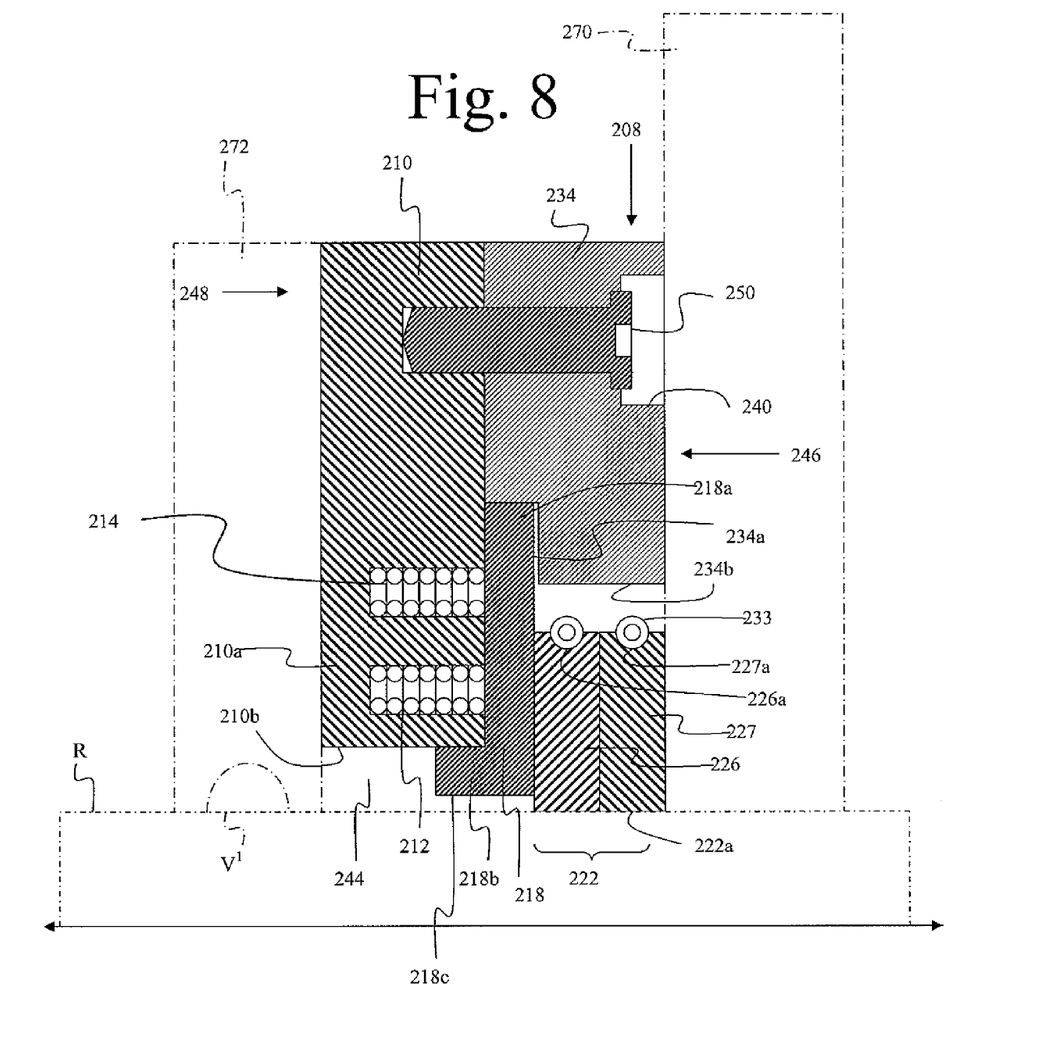
FIG. 8 is a fragmentary cross-sectional view of a cartridge device according to a second exemplary embodiment of the invention.
Figure 9:
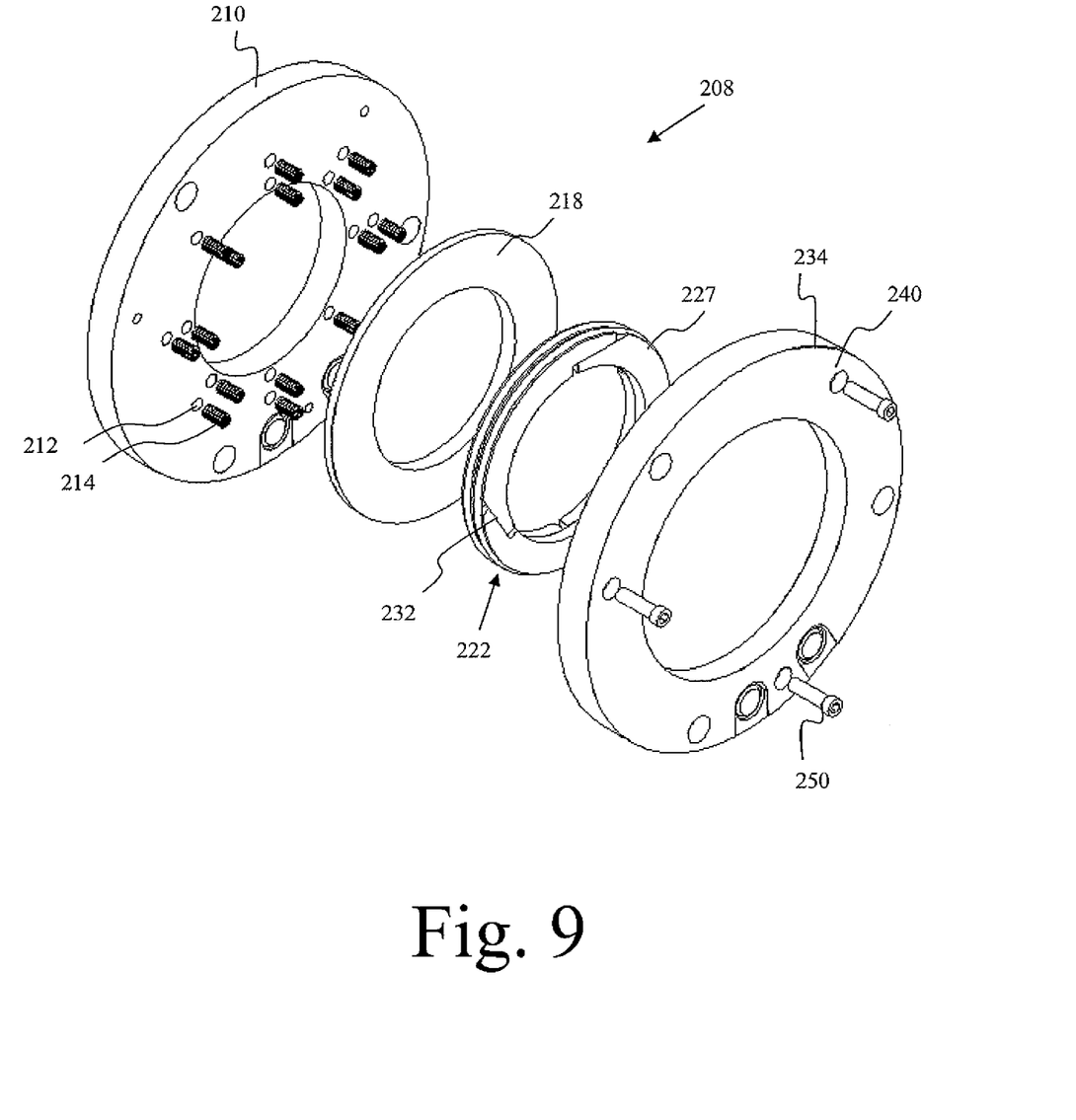
FIG. 9 is an exploded assembly view of the cartridge device of FIG. 8.

FIGS. 8 and 9 depict a cartridge 208 according to a second exemplary embodiment of the invention. The cartridge 208 is especially useful with equipment having movable rods/shafts, such as reciprocating compressors, pumps, and apparatus handling compressed fluids. The cartridge 208 of the second exemplary embodiment provides a structural seal which urges the medium being compressed into the upstream vent and/or drain lines V for controlled disposition.

The cartridge 208 includes an annular cartridge housing including a first housing plate 210 and a second housing plate 234 adjacent one another. The first and second housing plates 210, 234 contain bores 240 which align with one another to receive a mechanical fastener, such as a bolt or cap screw 250. The bore 240 of the first housing plate 210 is threaded. The bore 240 of the second housing plate 234 may be threaded or non-threaded. The bores 240 are shown countersunk into second housing plate 234. The aligned bores 240 may be circumferentially spaced around the first and second housing plates 210, 234. While three sets of aligned threaded bores 240 are shown in FIG. 9, the cartridge 208 may contain fewer or more bores 240. Alternatively, different fastening or bonding means may be employed for securing the cartridge housing together.

The first and second housing plates 210, 234 have radial inner surfaces 210b, 234b which define respective central openings sized to permit receipt and reciprocating movement of a shaft (also referred to as a rod) R. The central opening of the first housing plate 210 is smaller in diameter than the central opening of the second housing plate 234, as best shown in FIG. 8. The radial inner surface 234b of the second housing plate 234 includes a counterbore 234a defining a shoulder.

The first housing plate 210 includes a protruding portion 210a extending radially inward beyond the radial inner surface 234b of the second housing plate 234. The protruding portion 210a has a plurality of recesses 212 generally circumferentially uniformly spaced from one another about the first housing plate 210. The recesses 212 are paired in sets of two, with one recess being radially aligned with the other recess of its set. It should be understood that different arrangements of recesses 212 may be provided. Each of the recesses 212 receives a biasing member in the form of a compression spring 214. It should be understood that the biasing member may take other forms, including wave springs, o-rings, and mechanical, electrical, hydraulic, or pneumatic devices such as expandable bladders. Combinations of biasing members may be employed.

A pressure plate 218 is situated adjacent the first housing plate 210, and radially inside of the second housing plate 234. The pressure plate 218 is annular in shape. In the illustrated embodiment, the pressure plate 218 has a generally "L"-shaped cross section defined by a longer radially extending leg 218a extending along the protruding portion 210a of the first housing plate 210, and an optional shorter axially extending leg 218b or flange extending along the radial inner surface 210b of the first housing plate 210. A stem portion of the radially extending leg 218a of the pressure plate 218 is received in the counterbore 234a of the second plate 234. As illustrated, the width of the counterbore 234a is slightly more than the thickness of the radially extending leg 218a of the pressure plate 218. The side of the radially extending leg 218a of the pressure plate 218 contacts ends of the compression springs 214 to receive their biasing force. Although the springs 214 urge the pressure plate 218 axially away from the first housing plate 210, movement of the pressure plate 218 (axially away from the first housing plate 210) is limited by the shoulder of the counterbore 234a.

A segmented seal ring 222 is adjacent pressure plate 218. In the illustrated embodiment, the seal ring 222 is represented as a two-component ring including a first ring component 226 and a second ring component 227. The first ring component 226 comprises a plurality of segments (e.g., three) separated from one another by radial cuts (not shown, but similar to cuts 31 of FIG. 2). The second ring component 227 features a plurality (e.g., three) of segments separated from one another by non-radial (also known as tangential) cuts 232 (FIG. 9). The radial outer surfaces (outer edges) of the first and second ring components 226, 227 have grooves 226a, 227a. Resilient elements such as garter springs 233 are received in the grooves 226a, 227a and extend around the peripheries of the ring components 226, 227 for urging the segments of the ring components 226, 227 radially inward into sealing contact with the surface of rod R. The garter springs 233 securely retain the segments of each ring component 226, 227 together, while permitting each of the ring components 226, 227 to flexibly expand and contract radially outward and inward to accommodate any deviations in the outer diameter of the rod R or radial wear in ring components 226, 227.

It should be understood that alternative ring components and arrangements may be selected. The segmented seal ring 222 may include fewer or more components than are illustrated. Seal rings are known in the art, as described, for example, in U.S. Pat. No. 5,058,904. The segmented seal ring 222 may be replaced with other rings, either sealing or non-sealing, such as scrapers. Scrapers are generally known in the art and described, for example, in U.S. Pat. No. 1,828,178. Alternatively, the seal rings 222 may be non-segmented solid rings.

As mentioned above, the compression springs 214 impart a biasing force against the pressure plate 218. This biasing force urges the pressure plate 218 axially into contact with the segmented seal ring 222. In the second exemplary embodiment, the width of the counterbore 234a is slightly greater than the thickness of the radially extending leg portion 218a of the pressure plate 218 to allow the pressure plate 218 to slide against rings 222. The ring 222 is in turn pressed against flange 270 and vent plate 272 (discussed below).

The segmented seal ring 222 has a radial inner periphery 222a with a first inner diameter for establishing a sealing interface with the reciprocal rod R. The pressure plate 218 has a radial inner surface 218c with a second inner diameter which is greater than the first inner diameter of the segmented seal ring 222. The larger second inner diameter of the radial inner surface 218c of the pressure plate 218 establishes spatial gap (forming part of spatial region 244) between the radial inner surface 218c of the pressure plate 218 and the surface of the reciprocating rod R.

The radial inner surface 210b of the first housing plate 210 has a third inner diameter which is greater than the second inner diameter of the pressure plate 218. A spatial gap is established between the radial inner surface 210b of the first housing plate 210 and the outer surface of the reciprocating rod R. Collectively, the spatial gaps defined between the radial inner surface 210b of the first housing plate 210 and rod R, and between the radial surface 218c of the pressure plate 218 and rod R, communicate with one another to establish an L-shaped spatial region 244 that encircles the rod R. Although not shown, an internal passage, e.g., extending through one or both of the housing plates 210, 234, may deliver fluid to the spatial region 244. Internal passages are described above in connection with the first exemplary embodiment, and are designated in the drawings by reference numerals 52 and 152 in FIGS. 3 and 6, respectively.

Those skilled in the art will appreciate that end 248 (to the left in FIG. 8) of the cartridge 208 is the high pressure end and that the other end 246 (to the right in FIG. 8) of the cartridge 208 is the low pressure end. The cartridge 208 provides both a mechanical and fluid seal for rod R as it reciprocates within the central opening of the cartridge 208, thus preventing fluid being compressed at the high pressure end 248 from communicating with the low pressure end 246.

Figure 10:
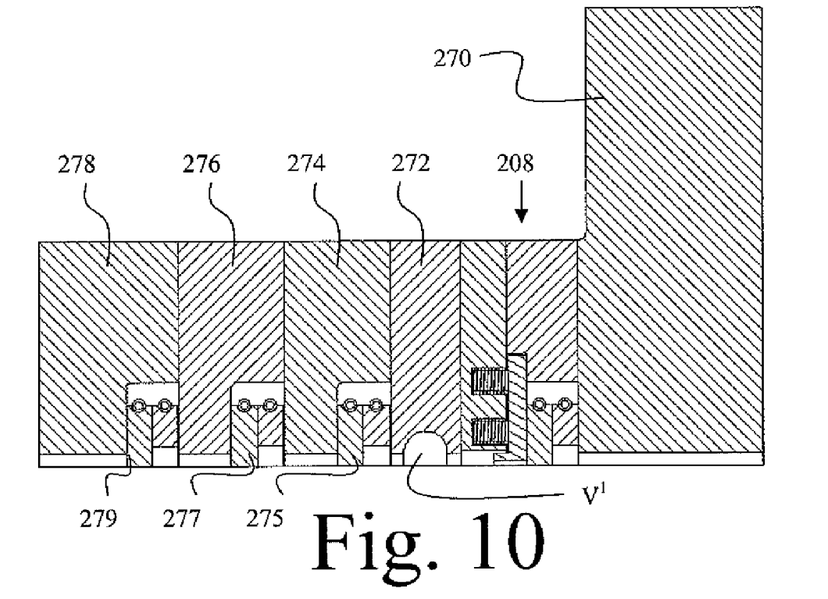
FIG. 10 is a fragmentary cross-sectional view of an assembly containing the cartridge device of FIGS. 8 and 9.
Figure 11:
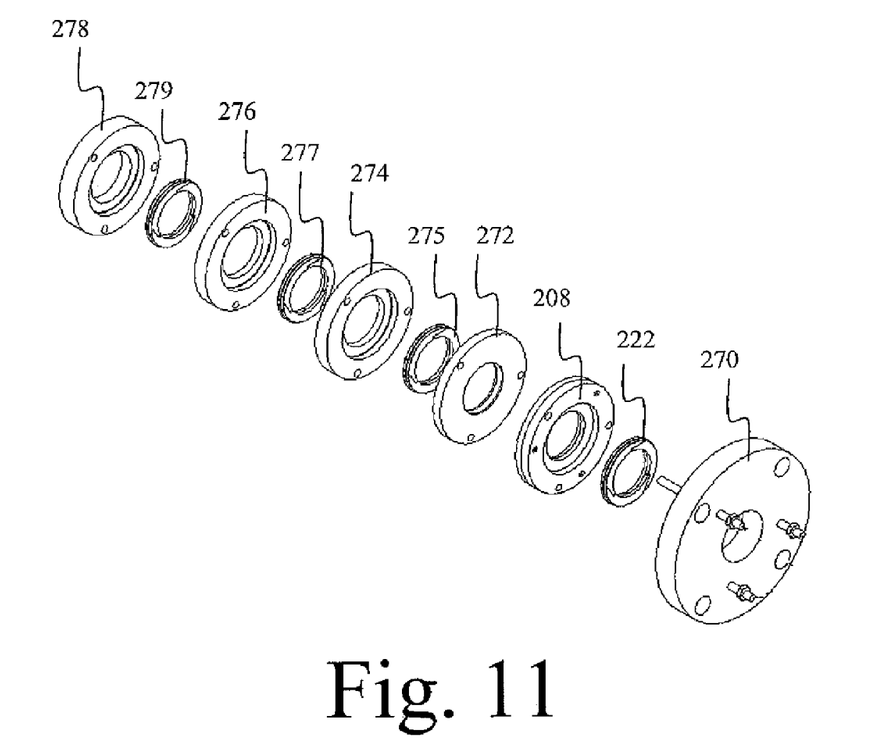
FIG. 11 is an exploded assembly view of the assembly of FIG. 10.

FIGS. 10 and 11 depict a cross-sectional view and an exploded assembly view, respectively, of an assembly containing the cartridge 208 described above. To the high pressure end 248 of cartridge 208 is a vent plate 272 with vent $V^1$, a first plain cup 274 with seal ring(s) 275, a second plain cup 276 with seal ring(s) 277, and an end cup 278 with seal ring(s) 279. The vent plate 272 includes a passage or vent $V^1$ to capture diverted gas. Adjacent to the lower pressure end 246 of cartridge 208 is a flange 270 containing holes for bolting or otherwise attaching the packing case to the compressor body, as well as connections for the internal passages. The assembly may include fewer or additional components than shown, such as gaskets, lube cups, and other components known in the art.

The cartridge 208 may be assembled together in any suitable manner. For example, according to one embodiment the compression springs 214 are fit in recesses 212 of the first housing plate 210. The pressure plate 218 is then placed on the side of the first housing plate 210 to enclose recesses 212 and fix the compression springs 214 in place. The second housing plate 234 is placed adjacent to the first housing plate 210 so as to receive an outer stem portion of the pressure plate 218 adjacent to shoulder of the counterbore 234a. A fastener 250 is inserted into aligned bores 240 of the housing plates 210, 234 and fixed in place, preferably by having screw threads in bores 240. The seal ring 222 is then loaded into the central cavity of the second housing plate 234. The seal ring 222 may be preloaded into the cartridge 208 or loaded when the cartridge 208 is installed on shaft/rod R.

When repairing the cartridge 208, damaged or worn ring 222 may be repaired or replaced without requiring removal of either the pressure plate 218 or the biasing member 214 from the housing structure or disassembly of the housing.

In certain embodiments of the invention, the cartridge is a self-contained side-loading low-friction cartridge designed to accommodate and actuate standard (seal or scraper, for example) rings used, for example, in a reciprocating compressor and/or pump against an adjacent surface. In the case of seal rings, a constant positive seal is established without the need of field personnel handling the small parts internal to the cartridge which produce the side-loading effect and without the radial loading component found in some prior art. Beneficially, in certain embodiments the cartridge device permits access to and removal and replacement of seal and/or scraper rings with no or limited disassembly of the device's other components, such as retainer rings and biasing members.

Additional advantages and modifications will readily occur to those skilled in the art. Therefore, the invention in its broader aspects is not limited to the specific details, representative devices and methods, and illustrative examples shown and described. Accordingly, departures may be made from such details without departing from the spirit or scope of the general inventive concept as defined by the appended claims and their equivalents.

What is claimed is:

1. A cartridge for mounting around a reciprocating shaft, the cartridge comprising:
    a cartridge housing;
    first and second rings having respective radial inner peripheries for establishing interfaces with a reciprocating shaft;
    first and second pressure plates situated in the cartridge housing between the first and second rings, said first and second pressure plates having respective radially extending legs received in said housing to limit a sliding movement of said pressure plates; and
    a biasing member urging the first and second pressure plates towards the first and second rings, respectively.

2. The cartridge of claim 1, wherein the first and second rings are segmented seal rings.

3. The cartridge of claim 1, wherein the first and second rings are solid seal rings.

4. The cartridge of claim 1, wherein:
    the cartridge housing comprises a central body portion; and
    wherein the radially extending legs are respectively situated on opposite sides of the central body.

5. The cartridge of claim 4, wherein the cartridge housing further comprises:
    first and second outer body portions situated on opposite sides of the central body portion; and
    a fastener connecting the first and second outer body portions and central body portion together.

6. The cartridge of claim 4, wherein the central body portion has a biasing member-receiving opening.

7. The cartridge of claim 6, wherein the biasing member comprises a compression spring received in the biasing member-receiving opening of the central body portion.

8. The cartridge of claim 1, wherein:
    the radial inner peripheries of the first and second rings have a first inner diameter; and
    the first and second pressure plates have respective radial inner surfaces with a second inner diameter which is greater than the first inner diameter of the first and second rings for establishing a spatial gap between the radial inner surfaces of the pressure plates and the reciprocating shaft.

9. The cartridge of claim 8, wherein a central body portion of the cartridge housing has a radial inner surface having a third inner diameter which is greater than the second inner diameter of the pressure plates for establishing a spatial gap between the radial inner surface of the central body portion and the movable shaft.

10. The cartridge of claim 9, wherein the spatial gaps established by the radial inner surfaces of the central body portion and pressure plates relative to the movable shaft collectively form a T-shape spatial region.

11. The cartridge of claim 8, wherein the cartridge housing contains an internal passage for delivering fluid to the spatial gap.

12. The cartridge of claim 1, wherein the biasing member urges the first and second pressure plates into sufficiently tight contact with the first and second rings, respectively, to establish fluid-tight seals between the first and second rings and components adjacent the first and second rings.

13. A compressor assembly, comprising:
a reciprocating shaft;
the cartridge of claim 1 fitted on the reciprocating shaft; and
at least one annular member fitted on the movable shaft adjacent to the cartridge.

14. A cartridge for mounting around a reciprocating shaft, the cartridge comprising:
a cartridge housing;
first and second rings having respective radial inner peripheries for establishing a respective contact interface with a reciprocating shaft;
first and second pressure plates situated in the cartridge housing between the first and second rings, said first and second pressure plates having respective radially extending legs received in said housing to limit a sliding movement of said pressure plates; and
a biasing member situated in the cartridge housing urging the first and second pressure plates towards the first and second rings, respectively
wherein the first and second rings are removable from the cartridge housing without requiring removal of either one of the pressure plates or the biasing member from the cartridge housing.

15. An assembly, comprising:
a reciprocating shaft;
the cartridge of claim 14 fitted on the reciprocating shaft; and
at least one annular member fitted on the movable shaft adjacent to the cartridge.

16. A cartridge for mounting around a movable shaft, the cartridge comprising:
a cartridge housing having a protruding portion;
a ring having a radial inner periphery for establishing a contact interface with a movable shaft;
a pressure plate situated in the cartridge housing between the protruding portion and the ring, said pressure plate having a radially extending leg received in said housing to limit a sliding movement of said pressure plate; and
a biasing member urging the pressure plate towards the ring,
wherein the ring is removable from the cartridge housing without requiring disassembly or removal of either the pressure plate or the biasing member.

17. The cartridge of claim 16, wherein the ring comprises a segmented seal ring.

18. The cartridge of claim 16, wherein the ring comprises a solid seal ring.

19. The cartridge of claim 16, wherein the cartridge housing has a biasing member-receiving opening.

20. The cartridge of claim 16, wherein the biasing member comprises a compression spring received in the biasing member-receiving opening.

21. The cartridge of claim 16, wherein:
the radial inner periphery of the ring has a first inner diameter; and
the pressure plate has a radial inner surface with a second inner diameter which is greater than the first inner diameter of the first and second rings for establishing a spatial gap between the radial inner surfaces of the pressure plates and the movable shaft.

22. The cartridge of claim 21, wherein the protruding portion has a radial inner surface with a third inner diameter which is greater than the second inner diameter of the pressure plate for establishing a spatial gap between the radial inner surface of the protruding portion and the movable shaft.

23. The cartridge of claim 22, wherein the spatial gaps established by the radial inner surface of the protruding portion and the pressure plate relative to the movable shaft collectively form a L-shaped spatial region.

24. The cartridge of claim 16, wherein the cartridge comprises first and second pressure plates and first and second rings, and wherein the biasing member urges the first and second pressure plates into sufficiently tight contact with the first and second rings, respectively, to establish fluid-tight seals between the first and second rings and components adjacent the first and second rings.

25. An assembly, comprising:
a reciprocating shaft;
the cartridge of claim 16 fitted on the reciprocating shaft; and
at least one annular member fitted on the movable shaft adjacent to the cartridge.

* * * * *